United States Patent
Mishra et al.

(10) Patent No.: US 9,712,388 B2
(45) Date of Patent: *Jul. 18, 2017

(54) SYSTEMS AND METHODS FOR DETECTING AND MANAGING CLOUD CONFIGURATIONS

(71) Applicants: Rajnish Mishra, San Jose, CA (US); Anupam Pandey, Sunnyvale, CA (US); Sachin Kumar, Santa Clara, CA (US); Jaspreet Singh, Patiala (IN); Anshul Behl, Ambala (IN); Kaleeswaran Karuppasamy, Milpitas, CA (US)

(72) Inventors: Rajnish Mishra, San Jose, CA (US); Anupam Pandey, Sunnyvale, CA (US); Sachin Kumar, Santa Clara, CA (US); Jaspreet Singh, Patiala (IN); Anshul Behl, Ambala (IN); Kaleeswaran Karuppasamy, Milpitas, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/235,329

(22) Filed: Aug. 12, 2016

(65) Prior Publication Data

US 2016/0352572 A1  Dec. 1, 2016

Related U.S. Application Data

(63) Continuation of application No. 14/487,584, filed on Sep. 16, 2014, now Pat. No. 9,444,685.

(51) Int. Cl.
*G06F 15/173* (2006.01)
*H04L 12/24* (2006.01)

(52) U.S. Cl.
CPC ...... *H04L 41/0853* (2013.01); *H04L 41/084* (2013.01); *H04L 41/0813* (2013.01); *H04L 41/0866* (2013.01); *H04L 41/22* (2013.01); *H04L 41/06* (2013.01)

(58) Field of Classification Search
None
See application file for complete search history.

(56) References Cited

U.S. PATENT DOCUMENTS

| | | | | |
|---|---|---|---|---|
| 2009/0183244 | A1* | 7/2009 | Saraf | G06F 21/604 726/6 |
| 2012/0005318 | A1* | 1/2012 | Beaty | H04L 41/0672 709/221 |
| 2012/0204267 | A1* | 8/2012 | Prafullchandra | G06Q 10/06 726/25 |

(Continued)

*Primary Examiner* — Peling Shaw
(74) *Attorney, Agent, or Firm* — Clements Bernard Walker PLLC; Lawrence A. Baratta, Jr.; Christopher L. Bernard

(57) ABSTRACT

A cloud configuration management method implemented in a cloud configuration management system communicatively coupled to one or more cloud nodes in a cloud system includes creating a plurality of golden configurations for each of a plurality of roles, wherein each of the one or more cloud nodes has one of the plurality of roles for operation in the cloud system; defining metadata rules for each of the plurality of golden configurations; performing a configuration analysis to audit the one or more cloud nodes using the metadata rules; and providing results of the configuration analysis to determine misconfiguration of any of the one or more cloud nodes.

20 Claims, 11 Drawing Sheets

(56) References Cited

U.S. PATENT DOCUMENTS

| | | | |
|---|---|---|---|
| 2013/0132547 A1* | 5/2013 | Reed | G06Q 50/01 709/223 |
| 2013/0198050 A1* | 8/2013 | Shroff | H04L 41/5009 705/34 |
| 2013/0239106 A1* | 9/2013 | Srinivasan | G06F 9/45558 718/1 |
| 2014/0006465 A1* | 1/2014 | Davis | G06F 17/30194 707/827 |
| 2014/0007239 A1* | 1/2014 | Sharpe | G06F 21/561 726/24 |
| 2014/0129819 A1* | 5/2014 | Huang | G06F 9/4416 713/2 |
| 2014/0279201 A1* | 9/2014 | Iyoob | G06Q 30/0631 705/26.7 |
| 2014/0317681 A1* | 10/2014 | Shende | H04L 63/10 726/1 |
| 2014/0336795 A1* | 11/2014 | Asenjo | G05B 19/4083 700/86 |
| 2014/0351205 A1* | 11/2014 | Fennell | G06F 17/30312 707/609 |
| 2015/0113144 A1* | 4/2015 | Bauer | H04L 47/70 709/226 |
| 2015/0277939 A1* | 10/2015 | Johnson | G06F 8/71 717/121 |
| 2015/0319185 A1* | 11/2015 | Kirti | H04L 63/1416 726/23 |

* cited by examiner

800

This utility provides a web interface to run Audits on Production Clouds and Nodes.

Please Select the Machines you want to run Audit for under SELECT MACHINES section.
Hit Submit under EXECUTE section to get real-time Audit Results.

| HOW TO RUN | SELECT MACHINES | EXECUTE | RESULTS |

Search Machine: [           ]

804

Cloud: [          v]  Type: [ ]ALL [ ]SMTP [ ]SMUI [ ]SMLB [ ]SME [ ]SMCA

| | Machine | IP | Type | Cloud |
|---|---|---|---|---|
| ✓ | one-atl1.smca | 199.168.149.18 | SMCA | zscalerone.net |
| ✓ | one-sunnyvale.smca | 199.168.148.18 | SMCA | zscalerone.net |
| ✓ | one-nyc2.pac | 199.168.151.21 | SMCA | zscalerone.net |
| ✓ | one-atl1.smea | 199.168.148.41 | SMCA | zscalerone.net |
| ✓ | one-atl1.pac | 216.52.207.84 | SMCA | zscalerone.net |

| HOW TO RUN | SELECT MACHINES | EXECUTE | RESULTS |

| Machines Selected |
| --- |
| zscalerone.net |
| one-atl1.smca, one-sunnyvale.smca, one-nyc2.pac, one-atl1.smea, one-atl1.pac |

Auditing...

SUBMIT

| HOW TO RUN | SELECT MACHINES | EXECUTE | RESULTS |

Selected Nodes for audit arezscalerone.net
one-atl1.smca, one-sunnyvale.smca, one-nyc2.pac, one-atl1.smea, one-atl1.pac

| NODE NAME | ANOMALIES DETECTED |
| --- | --- |
| one-atl1.smca | 17 |
| one-sunnyvale.smca | 16 |
| one-nyc2.pac | 5 |
| one-atl1.smea | 5 |
| one-atl1.pac | 4 |

DETAILED REPORT

SUBMIT

| HOW TO RUN | SELECT MACHINES | EXECUTE | RESULTS |

| [Section] Parameter | Total count of file changes per parameter |
|---|---|
| [SMCA] maxdb_conn | 2 |
| [SMCA] ahm_smedns1_host_name | 2 |
| [SMCA] sslcacertificate | 2 |
| [SMCA] ahm_conf_gen_delay | 2 |
| [SMCDSC] serv_ip | 2 |
| [SMCA] smcdss_ip | 3 |
| ... | |

Search | Collapse All | Expand All | Export CSV

| [Section] Parameter | Condition | Configured Value | Golden Value |
|---|---|---|---|
| one-atl1.smca | In Zcloud, ID is 4506 | | |
| | Role is SMCA | | |
| Max_DB_Conn | Mandatory | Not configured | 64 |
| Hostname | Mandatory | Not configured | dn.zscaler.com |
| SSL_Certificate | Mandatory | sslcertAAA | sslcertBBB |
| Server IP | Mandatory | 66.111.111.111 | 111.111.111.111 |
| DNS IP | Mandatory | 66.111.111.112 | 111.111.111.112 |
| one-sunnyvale.smca | | | |
| one-nyc2.pac | | | |
| one-atl1.smca | | | |
| one-atl1.pac | | | |

[Search] [Collapse All] [Expand All] [Export CSV]

| # | CLOUD NAME | AUDIT TIME | DETAILS |
|---|---|---|---|
| 1 | CLOUDA | 2014-08-01 10:23:11 | Detailed Report |
| 2 | CLOUDB | 2014-07-30 18:22:43 | Detailed Report |
| 3 | ... | ... | Detailed Report |

| HOW TO RUN | SELECT MACHINES | EXECUTE | RESULTS |

FIG. 14

SYSTEMS AND METHODS FOR DETECTING AND MANAGING CLOUD CONFIGURATIONS

CROSS-REFERENCE TO RELATED APPLICATION(S)

This patent application/patent is a continuation of co-pending U.S. patent application Ser. No. 14/487,584 filed Sep. 16, 2014, and entitled "SYSTEMS AND METHODS FOR DETECTING AND MANAGING CLOUD CONFIGURATIONS," the contents of which are incorporated in full by reference herein.

FIELD OF THE DISCLOSURE

The present disclosure relates generally to computer networking systems and methods. More particularly, the present disclosure relates to systems and methods for detecting and managing cloud configurations.

BACKGROUND OF THE DISCLOSURE

Cloud computing has proliferated with the prevalence of connected devices. Cloud computing in general can be defined as a computer network which includes, computing hardware machine or group of computing hardware machines commonly referred as a server or servers connected through a communication network such as the Internet, an intranet, a local area network (LAN) or wide area network (WAN). Any individual user who has permission to access the server can use the server's processing power to run an application, store data, or perform any other computing task. Therefore, instead of using a personal computer every time to run a native application, the user can now run the application from anywhere in the world, as the server provides the processing power to the application and the server is also connected to a network via the Internet or other connection platforms to be accessed from anywhere. In common usage the term "the cloud" has become a shorthand way to refer to cloud computing infrastructure. The phrase "in the cloud" also can refer to software, platforms and infrastructure that are sold "as a service", i.e. remotely through the Internet. Here, a service provide has actual servers which host products and services from a remote location, so end-users can simply log on to the network without installing anything. The major models of cloud computing service are known as software as a service, platform as a service, infrastructure as a service, security as a service, etc. Google, Amazon, IBM, Oracle Cloud, Rackspace, Salesforce, Zoho, Dropbox, Box.net, Microsoft, and Zscaler are some well-known cloud vendors/service providers.

In this context, service providers in the cloud must manage hardware (i.e., servers) across a geography. Service providers in the cloud often struggle with the configuration of core components over time. For example, a server configuration can be changed to avoid an existing defect or some critical issue or a short term solution. However, these configuration changes stick in the cloud and in time even the components providing similar services can become heterogeneous. Of course having similar components with different core configurations is problematic for the operations to manage the cloud. There are several challenges affecting cloud service providers. First, maintaining the cloud catering to different enterprise customers leads to configuration tuning of the cloud components/roles and tracking these configuration changes per customers is tedious. Second, cloud component configuration changes which are done to provide a short term fix often stay resulting in increased number of configuration sets for a particular role. Finally, as new features/functionality is rolled out, different components can be configured differently.

BRIEF SUMMARY OF THE DISCLOSURE

In an exemplary embodiment, a cloud configuration management method implemented in a cloud configuration management system communicatively coupled to one or more cloud nodes in a cloud system includes creating a plurality of golden configurations for each of a plurality of roles, wherein each of the one or more cloud nodes has one of the plurality of roles for operation in the cloud system; defining metadata rules for each of the plurality of golden configurations; performing a configuration analysis to audit the one or more cloud nodes using the metadata rules; and providing results of the configuration analysis to determine misconfigurations of any of the one or more cloud nodes. The cloud configuration management method can further include adjusting the plurality of golden configurations for customer specific configurations. The configuration analysis can include obtaining configuration files, associated with applications and hardware, from a cloud node and analyzing the configuration files using the metadata rules. The configuration analysis can be performed offline, by copying the configuration files by the cloud configuration management system, while the cloud node operates. The cloud configuration management method can further include performing a remedial action based on the determined misconfigurations. The results can be provided with an expected value and an actual value for each of determined misconfigurations. The cloud configuration management method can further include defining known exceptions; and ignoring any of the determined misconfigurations based on the known exceptions. The cloud configuration management method can further include correcting or accepting the determined misconfigurations. The cloud system can be a cloud based distributed security system with the plurality of roles being any of a processing node, an authority node, and a logging node.

In another exemplary embodiment, a cloud configuration management system communicatively coupled to one or more cloud nodes in a cloud system includes a network interface communicatively coupled to the one or more cloud nodes; a processor communicatively coupled to the network interface; and memory storing computer-executable instructions that, when executed, cause the processor to: create a plurality of golden configurations for each of a plurality of roles, wherein each of the one or more cloud nodes has one of the plurality of roles for operation in the cloud system; define metadata rules for each of the plurality of golden configurations; perform a configuration analysis to audit the one or more cloud nodes using the metadata rules; and provide results of the configuration analysis to determine misconfiguration of any of the one or more cloud nodes. The plurality of golden configurations can be adjusted for customer specific configurations. The configuration analysis can include obtaining configuration files, associated with applications and hardware, from a cloud node and analyzing the configuration files using the metadata rules. The configuration analysis can be performed offline, by copying the configuration files by the cloud configuration management system, while the cloud node operates. A remedial action can be performed based on the determined misconfigurations. The results can be provided with an expected value and an actual value for each of determined misconfigurations. The memory storing computer-executable instructions that, when executed, can further cause the processor to: define known exceptions; and ignore any of the determined misconfigurations based on the known exceptions. The memory storing computer-executable instructions that, when executed, can further cause the processor to: correct or accept the determined misconfigurations. The cloud system can be a cloud based distributed security system with the plurality of roles being any of a processing node, an authority node, and a logging node.

In a further exemplary embodiment, a cloud system with cloud configuration management implemented therein includes a plurality of cloud nodes; and a cloud configuration management system communicatively coupled to the plurality of cloud nodes, wherein the cloud configuration management system includes a network interface communicatively coupled to the one or more cloud nodes; a processor communicatively coupled to the network interface; and memory storing computer-executable instructions that, when executed, cause the processor to: create a plurality of golden configurations for each of a plurality of roles, wherein each of the one or more cloud nodes has one of the plurality of roles for operation in the cloud system; define metadata rules for each of the plurality of golden configurations; perform a configuration analysis to audit the one or more cloud nodes using the metadata rules; and provide results of the configuration analysis to determine misconfiguration of any of the one or more cloud nodes.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 8-14 are screen diagrams of exemplary user interface screens for an operation of a cloud configuration management system.

DETAILED DESCRIPTION OF THE DISCLOSURE

In various exemplary embodiments, systems and methods for detecting and managing cloud configurations are described. The systems and methods allow a cloud operation team to manage cloud components by knowing the running configuration and detecting deviations proactively. When the number of instances are large for a large cloud operator, the systems and methods provide easy manageability for customized configurations. The systems and methods can audit the cloud components periodically and/or on demand. All cloud component are scanned for configuration changes/deviations from predefined golden set (baseline). This is done in a different system thus not consuming costly system resources of the cloud components serving end users. Advantageously, the operator can detect these changes and take action before it becomes service impacting: 1. Increasing the service availability of the cloud; 2. configuration management is simplified; 3. Even short term configuration changes can be tracked via approved known exceptions; and 4. Deviation reports can be provided for any cloud and its component on demand for further audit/analysis.

Exemplary Cloud System Architecture

Figure 1:
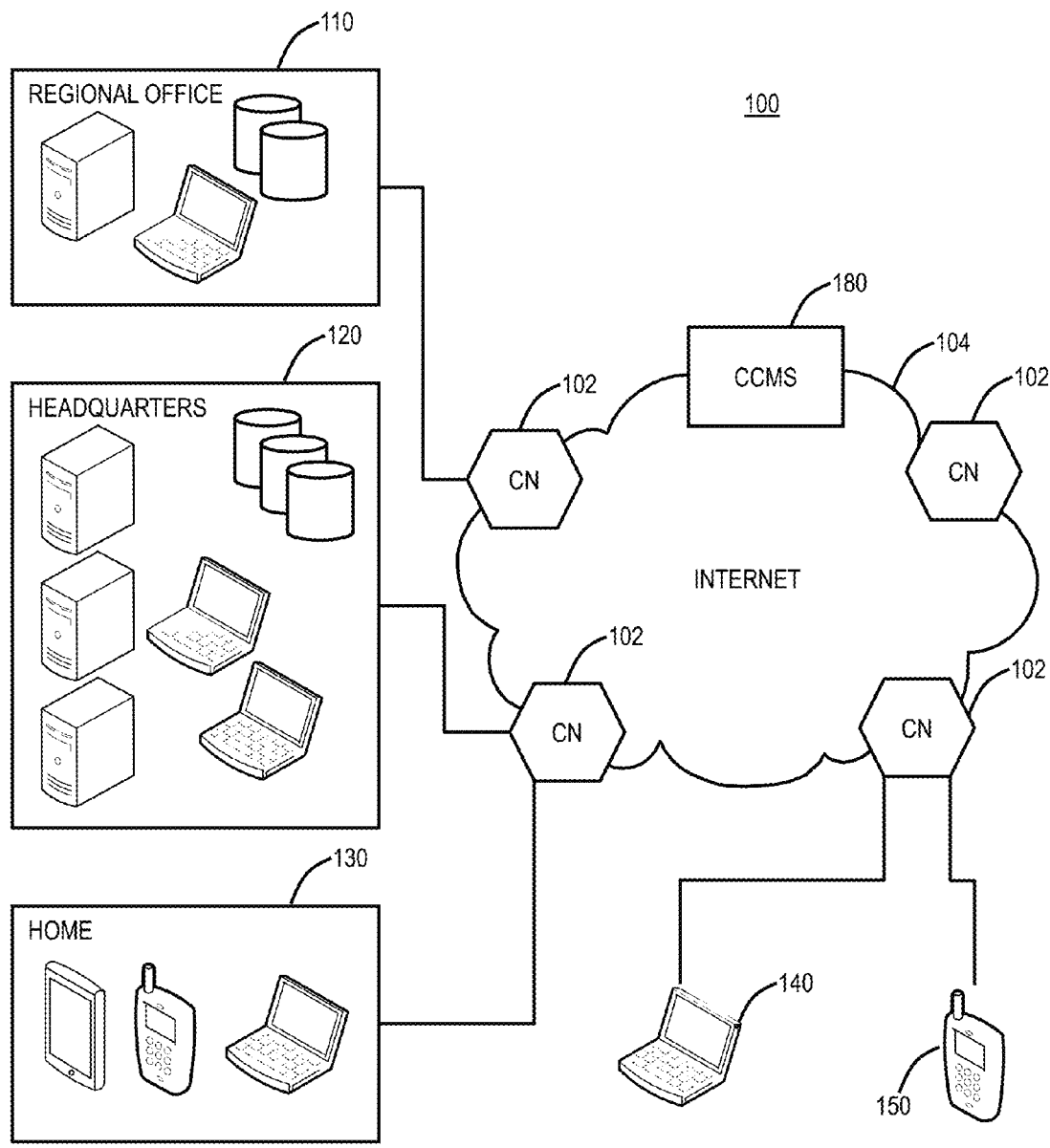
FIG. 1 is a network diagram of a cloud-based system.
Figure 2:
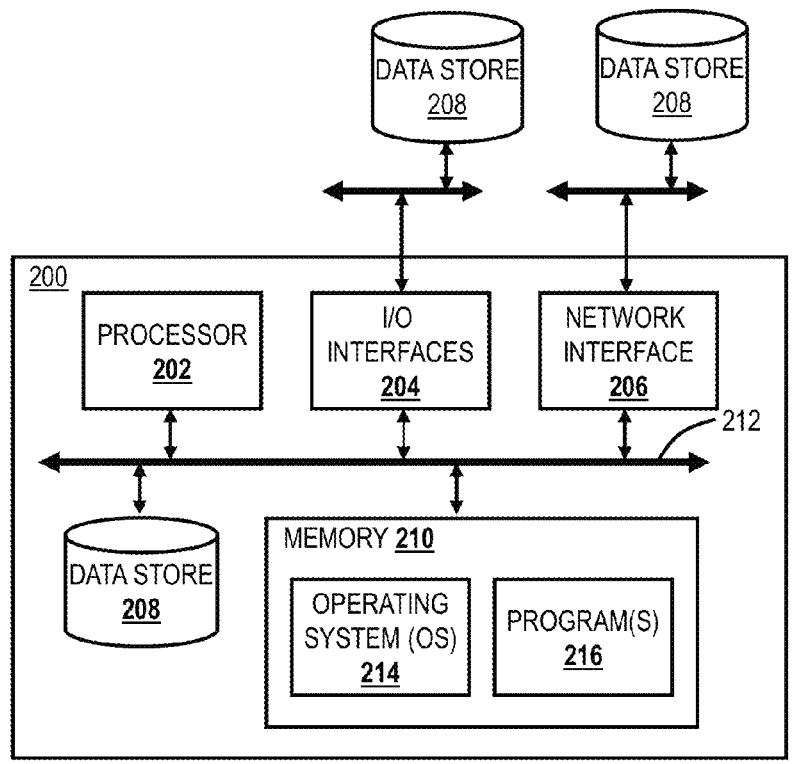
FIG. 2 is a block diagram of a server which may be used in the distributed security system of FIG. 1 or standalone.

Referring to FIG. 1, in an exemplary embodiment, a cloud system 100 is illustrated for implementing the cloud-based user-level policy, reporting, and authentication systems and methods over DNS and the like. The cloud system 100 includes one or more cloud nodes (CN) 102 communicatively coupled to the Internet 104. The cloud nodes 102 may be implemented as a server 200 (as illustrated in FIG. 2), or the like, and can be geographically diverse from one another such as located at various data centers around the country or globe. For illustration purposes, the cloud system 100 can include a regional office 110, headquarters 120, various employee's homes 130, laptops/desktops 140, and mobile devices 150 each of which can be communicatively coupled to one of the cloud nodes 102. Again, the cloud system 100 can provide any functionality such as software as a service, platform as a service, infrastructure as a service, security as a service, etc. to the locations 110, 120, 130 and devices 140, 150.

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud system 100 is illustrated herein as one exemplary embodiment of a cloud-based system, and those of ordinary skill in the art will recognize the cloud based mobile device security and policy systems and methods contemplate operation on any cloud based system.

In an exemplary embodiment, the cloud system 100 can be a distributed security system. Here, in the cloud system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud system 100 may be configured to perform various functions such as spam filtering, uniform resource locator (URL) filtering, antivirus protection, bandwidth control, data loss prevention, zero day vulnerability protection, web 2.0 features, and the like. In an exemplary embodiment, the cloud system 100 may be viewed as Security-as-a-Service through the cloud.

Figure 3:
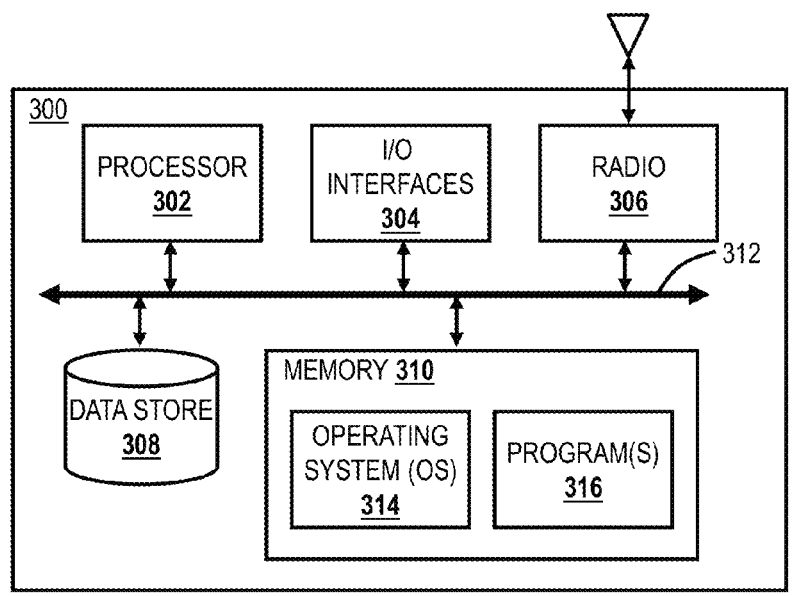
FIG. 3 is a block diagram of a mobile device which may be used in the system of FIG. 1 or with any other cloud-based system.

In an exemplary embodiment, the cloud system 100 can be configured to provide mobile device security and policy systems and methods. The mobile device 150 may be a mobile device 200 (as illustrated in FIG. 3), and may include common devices such as laptops, smartphones, tablets, netbooks, personal digital assistants, MP3 players, cell phones, e-book readers, and the like. The cloud system 100 is configured to provide security and policy enforcement for devices including the mobile devices 150 in the cloud. Advantageously, the cloud system 100, when operating as a distributed security system, avoids platform specific security apps on the mobile devices 150, forwards web traffic through the cloud system 100, enables network administrators to define policies in the cloud, and enforces/cleans traffic in the cloud prior to delivery to the mobile devices 150. Further, through the cloud system 100, network administrators may define user centric policies tied to users, not devices, with the policies being applied regardless of the device used by the user. The cloud system 100 provides 24×7 security with no need for updates as the cloud system 100 is always up-to-date with current threats and without requiring device signature updates. Also, the cloud system 100 enables multiple enforcement points, centralized provisioning and logging, automatic traffic routing to a nearest cloud node 102, geographical distribution of the cloud nodes 102, policy shadowing of users which is dynamically available at the cloud nodes 102, etc.

Cloud Configuration Management System (CCMS)

In various exemplary embodiments described herein, the cloud system 100 includes a Cloud Configuration Management System (CCMS) 180. Variously, the CCMS 180 is configured to provide easy detection of configuration deviations and to manage the configuration of the cloud system 100. In an exemplary embodiment, the CCMS 180 can be implemented in a server, such as described in FIG. 2. In another exemplary embodiment, the CCMS 180 can be a service run on any of the cloud nodes 102 or any other processing device in the cloud system 100. In a further exemplary embodiment, the CCMS 180 can be operated in a distributed fashion by the various cloud nodes 102. Other embodiments are also contemplated. The CCMS 180 is configured to identify and track all relevant elements of the configuration of the cloud system 100 deployed across the cloud nodes 102 so that all possible errors can be identified, tracked and possible solution recommended in timely manner. The objective is to define and design the CCMS 180 that can sanitize every configuration in the cloud system 100 before deployment, during production use and alert automatically if misconfiguration is detected.

Exemplary Server Architecture

Referring to FIG. 2, in an exemplary embodiment, a block diagram illustrates a server 200 which may be used in the cloud system 100, in other systems, or standalone. For example, the cloud nodes 102 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet, the WAN 101, the enterprise 200, and the like, etc. The network interface 206 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Exemplary Mobile Device Architecture

Referring to FIG. 3, in an exemplary embodiment, a block diagram illustrates a mobile device 300, which may be used in the cloud system 100 or the like. The mobile device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 3 depicts the mobile device 310 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the mobile device 310, a semiconductor-based microprocessor (in the form of a microchip or chip set), or generally any device for executing software instructions. When the mobile device 310 is in operation, the processor 302 is configured to execute software stored within the memory 310, to communicate data to and from the memory 310, and to generally control operations of the mobile device 310 pursuant to the software instructions. In an exemplary embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the mobile device 310. Additionally, the I/O interfaces 304 may further include an imaging device, i.e. camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end user functionality with the mobile device 300. For example, exemplary programs 316 may include, but not limited to, a web browser, social networking applications, streaming media applications, games, mapping and location applications, electronic mail applications, financial applications, and the like. In a typical example, the end user typically uses one or more of the programs 316 along with a network such as the cloud system 100.

Cloud Configuration Management Process

Figure 4:
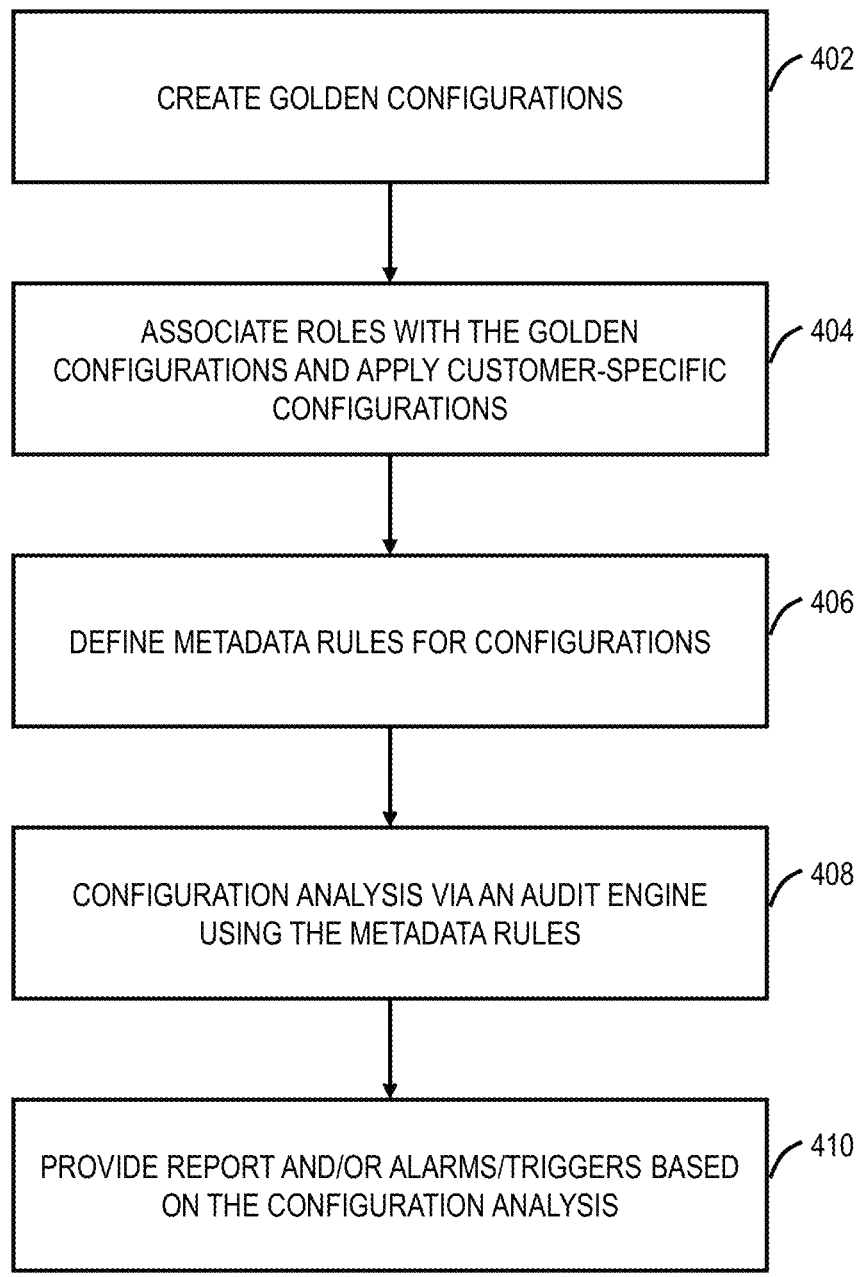
FIG. 4 is a flow chart of a cloud configuration management process.

Referring to FIG. 4, in an exemplary embodiment, a flow chart illustrates a cloud configuration management process 400. The cloud configuration management process 400 contemplates operation through the CCMS 180. The cloud configuration management process 400 includes creating golden configurations (step 402). The golden configurations can be stored in a data store or database associated with the CCMS 180. The cloud configuration management process 400 includes associating roles with the golden configurations and applying customer-specific configurations (step 404). The golden configurations include information such as components roles, key configuration files, key feature sets, etc. The CCMS 180 maintains golden files and configuration deviations for various clouds and roles. The CCMS 180 can also include a user interface to access this configuration deviation data on demand. Each role can be associated with a base golden configuration. The roles are the specific functions associated with each of the cloud nodes 102. For example, roles can be central authority (CA), proxy node, data storage node, administrative node, etc. Also, customer specific tunable/configuration can also be applied to the golden configurations resulting in golden ++ configuration for that role serving the set of customers.

The cloud configuration management process 400 includes defining metadata rules for various configurations (step 406). The metadata rules are for the parameters of configuration files and defined feature sets. Every parameter can be put into one of the following buckets: a. Mandatory, b. Mandatory-optional, c. Mandatory-conditional, and d. Ignore. The cloud configuration management process 400 includes performing a configuration analysis via an audit engine using the metadata rules (step 408). This can be performed periodically based on a time trigger or a notification/event from a component. The configuration analysis/audit engine analyzes configurations. The base golden or golden ++ configuration is used along with the metadata rules. Deviations are detected and flagged via an alarm/trigger and provided based on the configuration rules (step 410). A report can be generated and stored in a data store for further analysis.

Again, the CCMS 180 is configured for automating various cloud configuration and management tasks, e.g. auditing the cloud nodes 102, raising alerts etc. The CCMS 180 can also be extended to more involved tasks such as provisioning of new nodes, build upgrades, post upgrade sanity checks, etc. High level functionality of the CCMS 180 can include Automatic Configuration Backup, Configuration Change Alerting, Configuration Comparisons and Audit, Cloud Configuration Compliance, and the like.

The golden configuration includes any parameters or feature bits that have an impact on the working and functionality of a cloud role/service, e.g. parameters in sc.conf, rc.conf, loader.conf, dataaccesscfg.xml and feature bits enforced from a CA database, can come under the golden configuration. There can be different golden configurations per Role per Cloud. Public and Private nodes may further have separate Golden Configurations. There can be golden configurations for application files, hardware, etc. Each parameter falls into below three categories:

| Parameter Type | Description |
| --- | --- |
| Mandatory | Parameter must be present with specified value |
| Mandatory Conditional | Parameter must be present in if a given condition is true. e.g. for specific node type etc. |
| Mandatory Ignored | Parameter must be present but it might have different values. So, check for the presence of the parameter but ignore the value |
| Optional | Parameter is optional. |

Configuration Analysis Process

Figure 5:
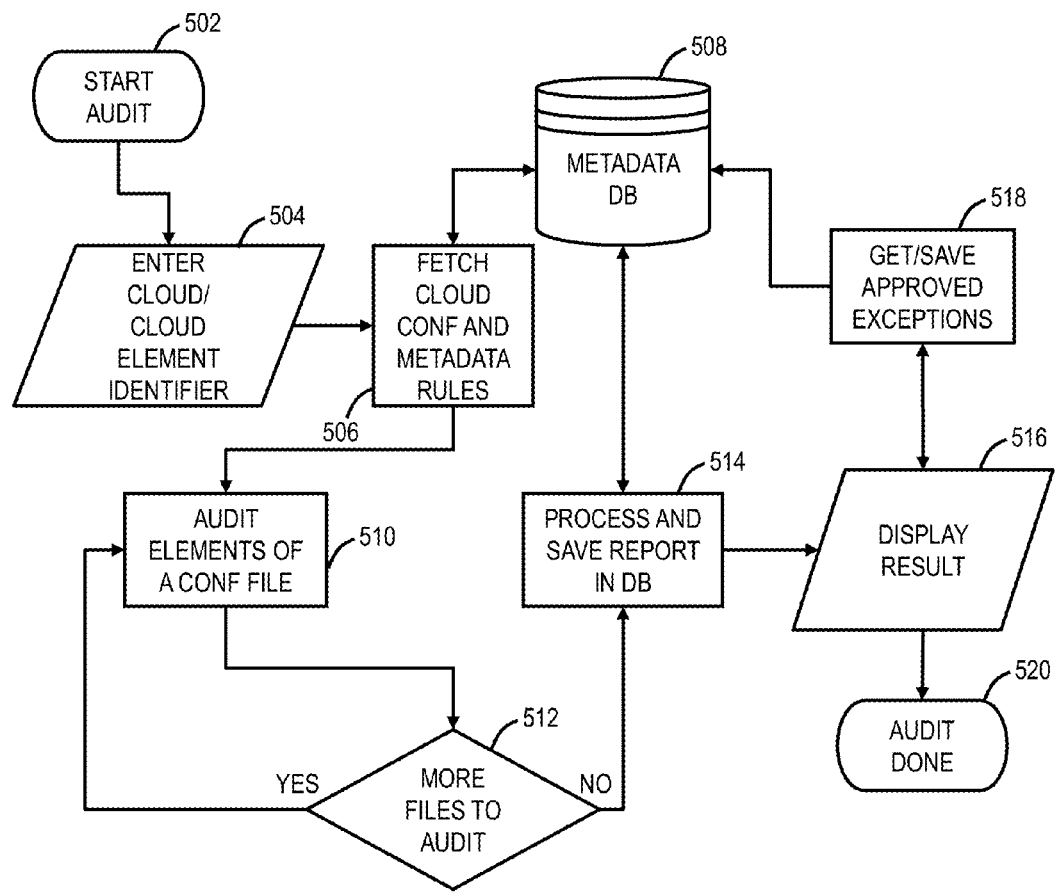
FIG. 5 is a flow chart of a configuration analysis process.

Referring to FIG. 5, in an exemplary embodiment, a flow chart illustrates a configuration analysis process 500. The configuration analysis process 500 is implemented by the CCMS 180, and provides further details of the step 408 in the cloud configuration management process 400. The cloud configuration management process 400 includes starting an audit (step 502). Again, the audit can be started periodically based on settings or manually, on-demand. The configuration analysis process 500 includes entering a cloud/cloud element identifier (step 504). The identifier uniquely identifies the cloud node 102 in the associated cloud system 100. The configuration analysis process 500 includes fetching cloud configuration and metadata rules (step 506). The metadata rules can be obtained from a metadata database 508. Now, the configuration analysis process 500 has the golden configuration for the identified role of the cloud node 102 and the latest configuration of the cloud node 102 from a repository associated with the cloud node 102.

The configuration analysis process 500 includes performing an audit of elements of the configuration files of the cloud node 102 (step 510) until all files are audited (step 512). During the audit, the configuration analysis process 500 looks for deviations from the golden configuration (or golden ++ configuration), and any known exceptions are confirmed and ignored. Known exceptions are expected deviations. The metadata rules are used for this analysis. The configuration analysis process 500 processes the rules and saves a report in a database, such as the metadata database 508 (step 514). The configuration analysis process 500 can display the results (step 516). Any deviations from golden configurations can be made available in a user friendly format. For example, an alert can be generated in a format, such as:

| Cloud Node | Role | Golden configuration file | Expected Value | Actual Value |
| --- | --- | --- | --- | --- |

The configuration analysis process 500 can include getting/saving approved exceptions from a user viewing the results (step 518). These approved exceptions can be saved in the metadata database 508. Finally, the configuration analysis process 500 ends (step 520).

The audit can be run utilizing a script that is capable of auditing configuration files offline. Here, the required hardware and application files are copied from the cloud node 102 and available offline in a repository, such as in the CCMS 180. The configuration analysis process 500 can provide a per cloud node 102, per file drilldown. The parameter value comparison is sensitive to sections within configuration files for e.g. a specific parameter can appear inside different sections. The script is able to handle these as either different parameters or the same, basically it should be section aware. The parameter value is compared based on a predefined rule set. Every parameter is defined in metadata rules having a comparison criteria associated to it; default should be mandatory.

The configuration analysis process 500 can be implemented in computer-executable instructions with three exemplary modules—a configuration file reader module, a comparison module, and a display module. The configuration file reader module reads and populates a data structure for every file that is part of the golden configuration that should have this data populated. The comparison module compares the golden configuration and configuration data structures based on the metadata rules and populate another similar data structure per node having only differences. The display module enables results to be read and logged in a readable format. This module is also responsible for saving the results in appropriate database table.

Example Cloud System—Cloud-Based Distributed Security System

Figure 6:
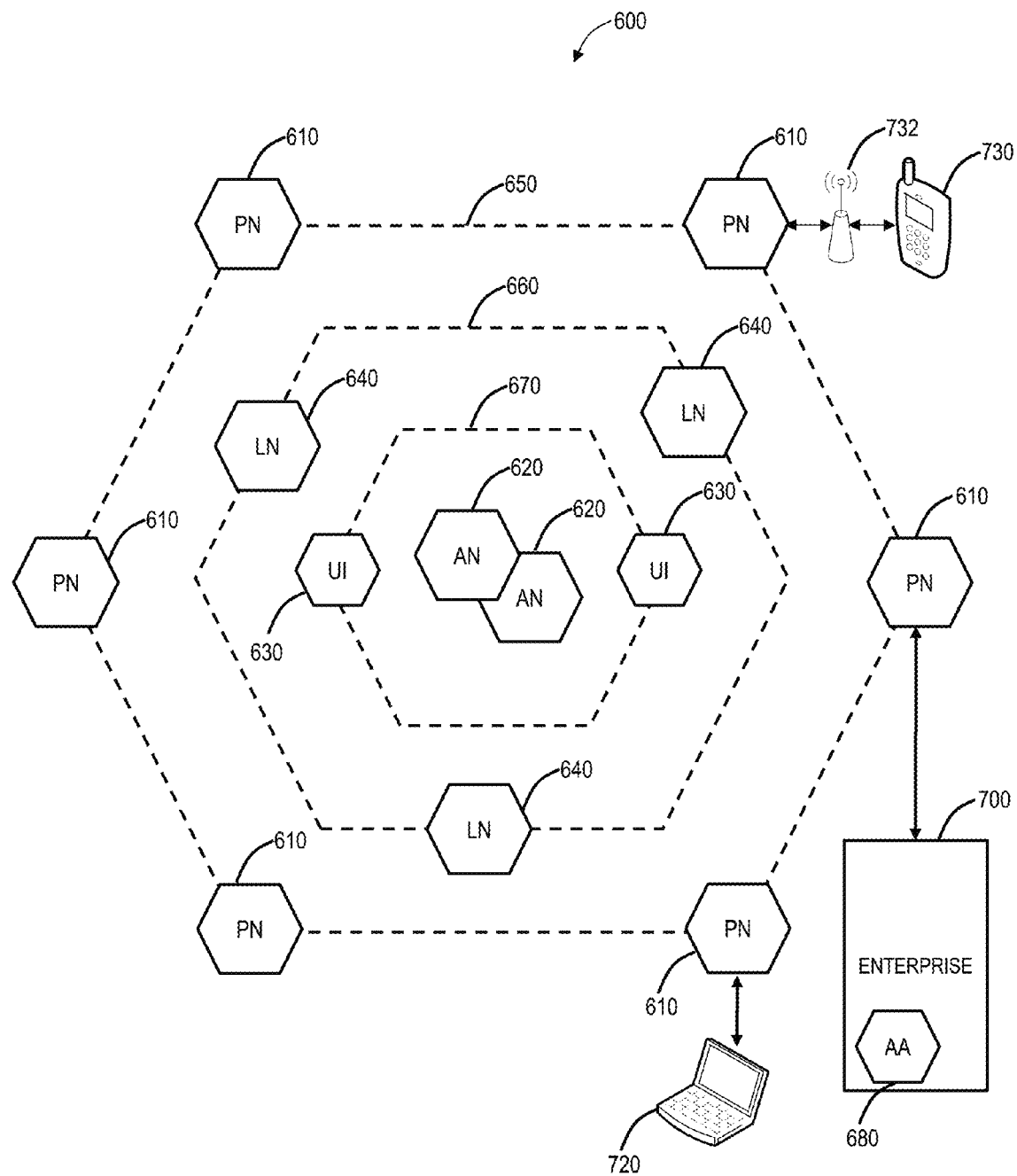
FIG. 6 is a block diagram of a cloud-based distributed security system.

Referring to FIG. 6, in an exemplary embodiment, a block diagram illustrates a cloud-based distributed security system 600. The cloud-based distributed security system 600 is illustrated as one example cloud system 100 which can utilize the systems and methods described herein. Other implementations of the cloud system 100 are also contemplated.

The system 600 can, for example, be implemented as an overlay network in a wide area network (WAN), such as the Internet, a local area network (LAN), or the like. The system 600 includes content processing nodes, processing nodes 610, that proactively detect and preclude the distribution of security threats, e.g., malware, spyware, viruses, trojans, botnets, email spam, data leakage, policy violations, etc., and other undesirable content sent from or requested by an external system. Example external systems can include an enterprise 700, a computer device 720, and a mobile device 730, or any other network and computing systems communicatively coupled to the system 600. In an exemplary embodiment, each of the processing nodes 610 can include a decision system and method, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 610. In another exemplary embodiment, specific data specified by each external system, e.g., only email, only executable files, etc., is process through one of the processing node 610.

Each of the processing nodes 610 can generate a decision vector D=[d1, d2, . . . , dn] for a content item of one or more parts C=[c1, c2, . . . , cm]. Each decision vector can identify a threat classification, e.g., clean, spyware, malware, undesirable content, innocuous, spam email, unknown, data leakage, policy violation, etc. For example, the output of each element of the decision vector D can be based on the output of one or more data inspection engines. In an exemplary embodiment, the threat classification can be reduced to a subset of categories e.g., violating, non-violating, neutral, unknown. Based on the subset classification, the processing node 610 can allow distribution of the content item, preclude distribution of the content item, allow distribution of the content item after a cleaning process, or perform threat detection on the content item. In an exemplary embodiment, the actions taken by one of the processing nodes 610 can be determinative on the threat classification of the content item and on a security policy of the external system to which the content item is being sent from or from which the content item is being requested by. A content item is violating if, for any part C=[c1, c2, . . . , cm] of the content item, at any of the processing nodes 610, any one of the data inspection engines generates an output that results in a classification of "violating."

Each of the processing nodes 610 can be implemented by one or more of computer and communication devices, e.g., server computers, gateways, switches, etc., such as the server 300 described in FIG. 3. In an exemplary embodiment, the processing nodes 610 can serve as an access layer 650. The access layer 650 can, for example, provide external system access to the security system 600. In an exemplary embodiment, each of the processing nodes 610 can include Internet gateways and one or more servers, and the processing nodes 610 can be distributed through a geographic region, e.g., throughout a country, region, campus, etc. According to a service agreement between a provider of the system 600 and an owner of an external system, the system 600 can thus provide security protection to the external system at any location throughout the geographic region.

Data communications can be monitored by the system 600 in a variety of ways, depending on the size and data requirements of the external system. For example, an enterprise 700 can have multiple routers, switches, etc. that are used to communicate over the Internet, and the routers, switches, etc. can be configured to establish communications through the nearest (in traffic communication time or geographically, for example) processing node 610. A mobile device 730 can be configured to communicated to a nearest processing node 610 through any available wireless access device, such as an access point, high-speed wireless access, or a cellular gateway. A single computer device 720, such as a user's personal computer, can have its browser and email program configured to access the nearest processing node 610, which, in turn, serves as a proxy for the computer device 720. Alternatively, an Internet provider can have all of its customer traffic processed through the processing nodes 610.

In an exemplary embodiment, the processing nodes 610 can communicate with one or more authority nodes (AN) 620. The authority nodes 620 can store policy data for each external system and can distribute the policy data to each of the processing nodes 610. The policy can, for example, define security policies for a protected system, e.g., security policies for the enterprise 700. Example policy data may define access privileges for users, web sites and/or content that is disallowed, restricted domains, acceptable use, data leakage prevention, etc. The authority nodes 620 can distribute the policy data to the processing nodes 610. In an exemplary embodiment, the authority nodes 620 can also distribute threat data that includes the classifications of content items according to threat classifications, e.g., a list of known viruses, a list of known malware sites, spam email domains, a list of known phishing sites, list of data leakage prevention terms, etc. The distribution of threat data between the processing nodes 610 and the authority nodes 620 can implemented by push and pull distribution schemes described in more detail below. In an exemplary embodiment, each of the authority nodes 620 can be implemented by one or more computer and communication devices, e.g., server computers, gateways, switches, etc., such as the server 300 described in FIG. 3. In some exemplary embodiments, the authority nodes 620, the logging nodes 640, and user interface (UI) front-ends 630 can serve as an application layer 660. The application layer 660 can, for example, manage and provide policy data, threat data, and data inspection engines and dictionaries for the processing nodes 610.

Other application layer functions can also be provided in an application layer 670, such as the user interface (UI) front-end 630. The user interface front-end 630 can provide a user interface through which users of the external systems can provide and define security policies, e.g., whether email traffic is to be monitored, whether certain web sites are to be precluded, etc. Another application capability that can be provided through the user interface front-end 630 is security analysis and log reporting. The underlying data on which the security analysis and log reporting functions operate are stored in logging nodes (LN) 640, which serve as a data logging layer, i.e. the application layer 660 can be referred to as the data logging layer. Each of the logging nodes 640 can store data related to security operations and network traffic processed by the processing nodes 610 for each external system. In an exemplary embodiment, the logging node 640 data can be anonymized so that data identifying an enterprise is removed or obfuscated. For example, identifying data can be removed to provide an overall system summary of security processing for all enterprises and users without revealing the identity of any one account. Alternatively, identifying data can be obfuscated, e.g., provide a random account number each time it is accessed, so that an overall system summary of security processing for all enterprises and users may be broken out by accounts without revealing the identity of any one account. In another exemplary embodiment, the identifying data and/or logging node 640 data can be further encrypted, e.g., so that only the enterprise (or user if a single user account) can have access to the logging node 640 data for its account. Other processes of anonymizing, obfuscating, or securing logging node 640 data may also be used. As is described herein, the archiving systems and methods can be implemented with the processing nodes 610, the authority nodes, and the logging nodes 640 to ensure that no private data is stored in the system 600.

In an exemplary embodiment, an access agent 680 can be included in the external systems. For example, the access agent 680 is deployed in the enterprise 700. The access agent 680 can, for example, facilitate security processing by providing a hash index of files on a client device to one of the processing nodes 610, or can facilitate authentication functions with one of the processing nodes 610, e.g., by assigning tokens for passwords and sending only the tokens to a processing node so that transmission of passwords beyond the network edge of the enterprise is minimized. Other functions and processes can also be facilitated by the access agent 680. In an exemplary embodiment, the processing node 610 can act as a forward proxy that receives user requests to external servers addressed directly to the processing node 610. In another exemplary embodiment, the processing node 610 can access user requests that are passed through the processing node 610 in a transparent mode. A protected system, e.g., enterprise 700, can, for example, choose one or both of these modes. For example, a browser can be configured either manually or through the access agent 680 to access the processing node 610 in a forward proxy mode. In the forward proxy mode, all accesses are addressed to the processing node 610.

In an exemplary embodiment, an enterprise gateway can be configured so that user requests are routed through the processing node 610 by establishing a communication tunnel between enterprise gateway and the processing node 610. For establishing the tunnel, existing protocols such as generic routing encapsulation (GRE), layer two tunneling protocol (L 2TP), or other Internet Protocol (IP) security protocols can be used. In another exemplary embodiment, the processing nodes can may be deployed at Internet service provider (ISP) nodes. The ISP nodes can redirect subject traffic to the processing nodes 610 in a transparent proxy mode. Protected systems, such as the enterprise 700, can use a multiprotocol label switching (MPLS) class of service for indicating the subject traffic that is to be redirected. For example, at the within the enterprise the access agent 680 can be configured to perform MPLS labeling. In another transparent proxy mode exemplary embodiment, a protected system, such as the enterprise 700, can identify the processing node 610 as a next hop router for communication with the external servers.

Operationally, the system 600 can provide policy-based, secure Internet access for any device, anywhere. The system 600 can be viewed as a cloud based security system. Traditionally, security was delivered as software which was installed on servers. Installation and deployment required time and expertise, prompting the migration to appliances. While the hardware simply plugs into existing infrastructures, multiple appliances must be installed at each gateway and an assortment of point products must be used to provide comprehensive security. Managing multiple user interfaces, policy managers, and log files is expensive, inefficient, and incomplete. In contrast, the system 600 provides SaaS, or cloud-delivered, security services. By analogy, rather than cleaning one's own water, one prefers water delivered through a tap on-demand; rather than generating one's own power, one prefers power delivered through power lines on-demand. In the same way, appliances are giving way to security as a service.

Using the system 600, IT administrators or the like define policies and simply forward corporate Internet traffic to the system 600. The system 600 allows or blocks the traffic and can be used for all users, including the enterprise 700, the computer device 720, and the mobile device 730. The enterprise 700 can include an organization's home and regional offices, the computer device 720 and the mobile device 730 can include road warriors, mobile phone users, home-based employees, etc. Specifically, users such as the enterprise 700, the computer device 720, and the mobile device 730 are all accessing external systems, e.g. the Internet, by way of the system 600, i.e. through one of the processing nodes 610. As such, security for the users 700, 720, 730 is pervasive and always present. There is no capital expenditure as investments are not required for either hardware or software at the users 700, 720, 730. SaaS and the system 600 frees precious IT resources from performing operational security chores of managing and patching boxes, and updating data feeds and signatures. It enables IT to focus on strategic security such as policy and architecture.

Example Detailed System Architecture and Operation

Figure 7:
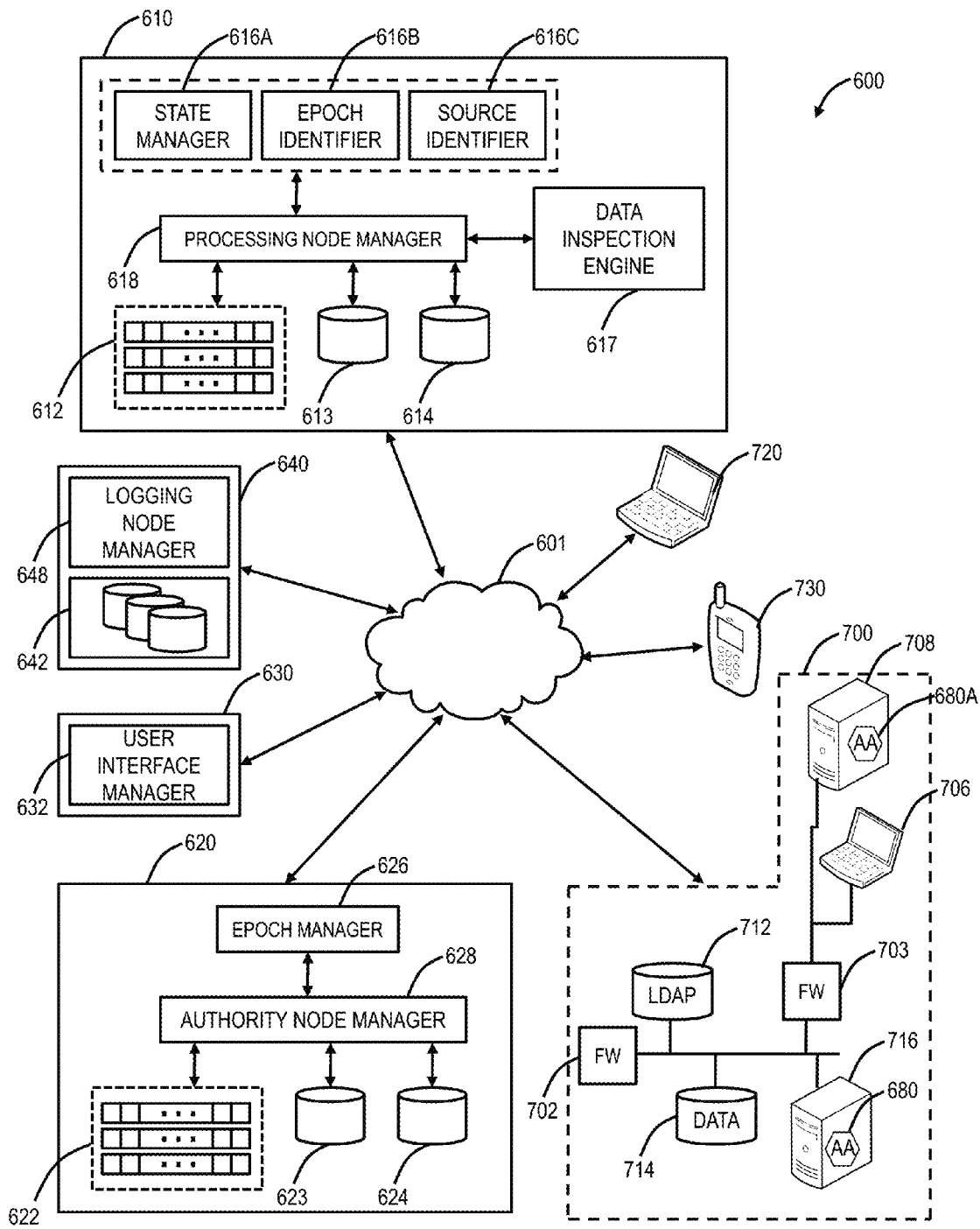
FIG. 7 is a block diagram of various components of the distributed security system of FIG. 6 in more detail.

Referring to FIG. 7, in an exemplary embodiment, a block diagram illustrates various components of the distributed security system 600 in more detail. Although FIG. 7 illustrates only one representative component processing node 610, authority node 620 and logging node 640, those of ordinary skill in the art will appreciate there can be many of each of the component nodes 610, 620 and 640 present in the system 600. A wide area network (WAN) 601, such as the Internet, or some other combination of wired and/or wireless networks, communicatively couples the processing node 610, the authority node 620, and the logging node 640 therebetween. The external systems 700, 720 and 730 likewise communicate over the WAN 601 with each other or other data providers and publishers, i.e. any content on any network. Some or all of the data communication of each of the external systems 700, 720 and 730 may be processed through the processing node 610.

FIG. 7 also shows the enterprise 700 in more detail. The enterprise 700 can, for example, include a firewall (FW) 702 protecting an internal network that may include one or more enterprise servers 716, a lightweight directory access protocol (LDAP) server 712, and other data or data stores 714. Another firewall 703 can protect an enterprise subnet that can include user computers 706 and 708 (e.g., laptop and desktop computers). The enterprise 700 can communicate with the WAN 601 through one or more network devices, such as a router, gateway, switch, etc. The LDAP server 712 can store, for example, user login credentials for registered users of the enterprise 700 system. Such credentials can include a user identifiers, login passwords, and a login history associated with each user identifier. The other data stores 714 can include sensitive information, such as bank records, medical records, trade secret information, or any other information warranting protection by one or more security measures.

In an exemplary embodiment, a client access agent 680*a* can be included on a client computer 708. The client access agent 680*a* can, for example, facilitate security processing by providing a hash index of files on the user computer 708 to a processing node 610 for malware, virus detection, etc. Other security operations can also be facilitated by the access agent 680*a*. In another exemplary embodiment, a server access agent 680 can facilitate authentication functions with the processing node 610, e.g., by assigning tokens for passwords and sending only the tokens to the processing node 610 so that transmission of passwords beyond the network edge of the enterprise 700 is minimized. Other functions and processes can also be facilitated by the server access agent 680*b*. The computer device 720 and the mobile device 730 can also store information warranting security measures, such as personal bank records, medical information, and login information, e.g., login information to the server 706 of the enterprise 700, or to some other secured data provider server.

Example Processing Node Architecture

In an exemplary embodiment, the processing nodes 610 are external to network edges of the external systems 700, 720 and 730. That is, the processing nodes 610 are connected to the external systems 700, 720 and 730, and not physically part thereof. For example, the processing nodes 610 could be located at data centers and the like and the external systems 700, 720 and 730 can connect to the processing nodes 610 through various networks over various network connectivity types (e.g., wireless, wired). Each of the processing nodes 610 stores security policies 613 received from the authority node 620 and monitors content items requested by or sent from the external systems 700, 720 and 730. In an exemplary embodiment, each of the processing nodes 610 can also store a detection process filter 612 and/or threat data 614 to facilitate the decision of whether a content item should be processed for threat detection. A processing node manager 618 can manage each content item in accordance with the security policy data 613, and the detection process filter 612 and/or threat data 614, if stored at the processing node 610, so that security policies for a plurality of external systems in data communication with the processing node 610 are implemented external to the network edges for each of the external systems 700, 720 and 730. For example, depending on the classification resulting from the monitoring, the content item can be allowed, precluded, or threat detected. In general, content items that are already classified as "clean" or not posing a threat can be allowed, while those classified as "violating" may be precluded. Those content items having an unknown status, e.g., content items that have not been processed by the system 600, may be threat detected to classify the content item according to threat classifications.

The processing node 610 can include a state manager 616A. The state manager 616A can be used to maintain the authentication and the authorization states of users that submit requests to the processing node 610. Maintenance of the states through the state manager 616A can minimize the number of authentication and authorization transactions that are necessary to process a request. An example of this state management is described in commonly assigned U.S. patent application Ser. No. 12/179,377, filed Jul. 24, 2008, and entitled "HTTP AUTHENTICATION AND AUTHORIZATION MANAGEMENT," the contents of which are incorporated by reference herein. The processing node 610 can also include an epoch processor 616B. The epoch processor 616B can be used to analyze authentication data that originated at the authority node 620. The epoch processor 616B can use an epoch ID to further validate the authenticity of authentication data. The processing node 610 can further include a source processor 616C. The source processor 616C can be used to verify the source of authorization and authentication data. The source processor 616C can identify improperly obtained authorization and authentication data, enhancing the security of the network. Collectively, the state manager 616A, the epoch processor 616B, and the source processor 616C operate as data inspection engines.

Because the amount of data being processed by the processing nodes 610 can be substantial, the detection processing filter 612 can be used as the first stage of an information lookup procedure. For example, the detection processing filter 612 can be used as a front end to a looking of the threat data 614. Content items can be mapped to index values of the detection processing filter 612 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 618 can identify the Uniform Resource Locator (URL) address of URL requests as the information key and hash the URL address; or can identify the file name and the file size of an executable file information key and hash the file name and file size of the executable file. Hashing an information key to generate an index and checking a bit value at the index in the detection processing filter 612 generally requires less processing time than actually searching threat data 614. The use of the detection processing filter 612 can improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 612, however, the worst case additional cost is only on the order of one, and thus its use for most failure queries saves on the order of m log m, where m is the number of information records present in the threat data 614.

The detection processing filter 612 thus improves performance of queries where the answer to a request for information is usually positive. Such instances can include, for example, whether a given file has been virus scanned, whether content at a given URL has been scanned for inappropriate (e.g., pornographic) content, whether a given fingerprint matches any of a set of stored documents, whether data contains data leakage prevention terms, and whether a checksum corresponds to any of a set of stored documents. Thus, if the detection processing filter 612 indicates that the content item has not been processed, then a worst case null lookup operation into the threat data 614 is avoided, and a threat detection can be implemented immediately. The detection processing filter 612 thus complements the threat data 614 that capture positive information. In an exemplary embodiment, the detection processing filter 612 can be a Bloom filter implemented by a single hash function. The Bloom filter can be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

Example Authority Node Architecture

In general, the authority node 620 includes a data store that stores master security policy data 623 for each of the external systems 700, 720 and 730. An authority node manager 628 may be used to manage the master security policy data 623, e.g., receive input from users of each of the external systems defining different security policies, and may distribute the master security policy data 623 to each of the processing nodes 610. The processing nodes 610 then store a local copy of the security policy data 613. The authority node 620 may also store a master detection process filter 622. The detection processing filter 622 may include data indicating whether content items have been processed by one or more of the data inspection engines 616 in any of the processing nodes 610. The authority node manager 628 may be used to manage the master detection processing filter 622, e.g., receive updates from a processing nodes 610 when the processing node 610 has processed a content item and update the master detection processing filter 622. For example, the master detection processing filter 622 can be distributed to the processing nodes 610, which then store a local copy of the detection processing filter 612.

In an exemplary embodiment, the authority node 620 can include an epoch manager 626. The epoch manager 626 can be used to generate authentication data associated with an epoch ID. The epoch ID of the authentication data is a verifiable attribute of the authentication data that can be used to identify fraudulently created authentication data. In an exemplary embodiment, the detection processing filter 622 can be a guard table. The processing node 610 can, for example, use the information in the local detection processing filter 612 to quickly determine the presence and/or absence of information, e.g., whether a particular URL has been checked for malware; whether a particular executable has been virus scanned, etc. The authority node 620 can also store master threat data 624. The master threat data 624 can classify content items by threat classifications, e.g., a list of known viruses, a list of known malware sites, spam email domains, list of known or detected phishing sites, data leakage terms, etc. The authority node manager 628 can be used to manage the master threat data 624, e.g., receive updates from the processing nodes 610 when one of the processing nodes 610 has processed a content item and update the master threat data 624 with any pertinent results. In some implementations, the master threat data 624 can be distributed to the processing nodes 610, which then store a local copy of the threat data 614. In another exemplary embodiment, the authority node 620 can also monitor the health of each of the processing nodes 610, e.g., the resource availability in each of the processing nodes 610, detection of link failures, etc. Based on the observed health of each of the processing nodes 610, the authority node 620 can redirect traffic among the processing nodes 610 and/or balance traffic among the processing nodes 610. Other remedial actions and processes can also be facilitated by the authority node 610.

Example Processing Node and Authority Node Communications

The processing node 610 and the authority node 620 can be configured according to one or more push and pull processes to manage content items according to security policy data 613 and/or 623, detection process filters 612 and/or 622, and the threat data 614 and/or 624. In a threat data push implementation, each of the processing nodes 610 stores policy data 613 and threat data 614. The processing node manager 618 determines whether a content item requested by or transmitted from an external system is classified by the threat data 614. If the content item is determined to be classified by the threat data 614, then the processing node manager 618 can manage the content item according to the security classification of the content item and the security policy of the external system. If, however, the content item is determined to not be classified by the threat data 614, then the processing node manager 618 can cause one or more of the data inspection engines 617 to perform the threat detection processes to classify the content item according to a threat classification. Once the content item is classified, the processing node manager 618 generates a threat data update that includes data indicating the threat classification for the content item from the threat detection process, and transmits the threat data update to an authority node 620.

The authority node manager 628, in response to receiving the threat data update, updates the master threat data 624 stored in the authority node data store according to the threat data update received from the processing node 610. In an exemplary embodiment, the authority node manager 628 can automatically transmit the updated threat data to the other processing nodes 610. Accordingly, threat data for new threats as the new threats are encountered are automatically distributed to each processing node 610. Upon receiving the new threat data from the authority node 620, each of processing node managers 618 can store the updated threat data in the locally stored threat data 614. In a threat data pull and push implementation, each of the processing nodes 610 stores policy data 613 and threat data 614. The processing node manager 618 determines whether a content item requested by or transmitted from an external system is classified by the threat data 614. If the content item is determined to be classified by the threat data 614, then the processing node manager 618 can manage the content item according to the security classification of the content item and the security policy of the external system. If, however, the content item is determined to not be classified by the threat data, then the processing node manager 618 can request responsive threat data for the content item from the authority node 620. Because processing a content item can consume valuable resource and time, in some implementations the processing node 610 can first check with the authority node 620 for threat data 614 before committing such processing resources.

The authority node manager 628 can receive the responsive threat data request from the processing node 610 and can determine if the responsive threat data is stored in the authority node data store. If responsive threat data is stored in the master threat data 624, then the authority node manager 628 provide a reply that includes the responsive threat data to the processing node 610 so that the processing node manager 618 can manage the content item in accordance with the security policy data 612 and the classification of the content item. Conversely, if the authority node manager 628 determines that responsive threat data is not stored in the master threat data 624, then the authority node manager 628 can provide a reply that does not include the responsive threat data to the processing node 610. In response, the processing node manager 618 can cause one or more of the data inspection engines 616 to perform the threat detection processes to classify the content item according to a threat classification. Once the content item is classified, the processing node manager 618 generates a threat data update that includes data indicating the threat classification for the content item from the threat detection process, and transmits the threat data update to an authority node 620. The authority node manager 628 can then update the master threat data 624. Thereafter, any future requests related to responsive threat data for the content item from other processing nodes 610 can be readily served with responsive threat data.

In a detection process filter and threat data push implementation, each of the processing nodes 610 stores a detection process filter 612, policy data 613, and threat data 614. The processing node manager 618 accesses the detection process filter 612 to determine whether the content item has been processed. If the processing node manager 618 determines that the content item has been processed, it can determine if the content item is classified by the threat data 614. Because the detection process filter 612 has the potential for a false positive, a lookup in the threat data 614 can be implemented to ensure that a false positive has not occurred. The initial check of the detection process filter 612, however, can eliminate many null queries to the threat data 614, which, in turn, conserves system resources and increases efficiency. If the content item is classified by the threat data 614, then the processing node manager 618 can manage the content item in accordance with the security policy data 613 and the classification of the content item. Conversely, if the processing node manager 618 determines that the content item is not classified by the threat data 614, or if the processing node manager 618 initially determines through the detection process filter 612 that the content item is not classified by the threat data 614, then the processing node manager 618 can cause one or more of the data inspection engines 616 to perform the threat detection processes to classify the content item according to a threat classification. Once the content item is classified, the processing node manager 618 generates a threat data update that includes data indicating the threat classification for the content item from the threat detection process, and transmits the threat data update to one of the authority nodes 620.

The authority node manager 628, in turn, can update the master threat data 624 and the master detection process filter 622 stored in the authority node data store according to the threat data update received from the processing node 610. In an exemplary embodiment, the authority node manager 628 can automatically transmit the updated threat data and detection processing filter to other processing nodes 610. Accordingly, threat data and the detection processing filter for new threats as the new threats are encountered are automatically distributed to each processing node 610, and each processing node 610 may update its local copy of the detection processing filter 612 and threat data 614. In a detection process filter and threat data pull and push implementation, each of the processing nodes 610 stores a detection process filter 612, policy data 613, and threat data 614. The processing node manager 618 accesses the detection process filter 612 to determine whether the content item has been processed. If the processing node manager 618 determines that the content item has been processed, it can determine if the content item is classified by the threat data 614. Because the detection process filter 612 has the potential for a false positive, a lookup in the threat data 614 can be implemented to ensure that a false positive has not occurred. The initial check of the detection process filter 612, however, can eliminate many null queries to the threat data 614, which, in turn, conserves system resources and increases efficiency. If the processing node manager 618 determines that the content item has not been processed, it can request responsive threat data for the content item from the authority node 620. Because processing a content item may consume valuable resource and time, in some implementations the processing node 610 can first check with the authority node 620 for threat data 614 before committing such processing resources.

The authority node manager 628 can receive the responsive threat data request from the processing node 610 and can determine if the responsive threat data is stored in the authority node data 620 store. If responsive threat data is stored in the master threat data 624, then the authority node manager 628 provides a reply that includes the responsive threat data to the processing node 610 so that the processing node manager 618 can manage the content item in accordance with the security policy data 612 and the classification of the content item, and further update the local detection processing filter 612. Conversely, if the authority node manager 628 determines that responsive threat data is not stored in the master threat data 624, then the authority node manager 628 can provide a reply that does not include the responsive threat data to the processing node 610. In response, the processing node manager 618 can cause one or more of the data inspection engines 616 to perform the threat detection processes to classify the content item according to a threat classification. Once the content item is classified, the processing node manager 618 generates a threat data update that includes data indicating the threat classification for the content item from the threat detection process, and transmits the threat data update to an authority node 620. The authority node manager 628 can then update the master threat data 624. Thereafter, any future requests for related to responsive threat data for the content item from other processing nodes 610 can be readily served with responsive threat data.

The various push and pull data exchange processes provided above are exemplary processes for which the threat data and/or detection process filters may be updated in the system 600 of FIGS. 6 and 7. Other update processes, however, are contemplated herewith. The data inspection engines 616, processing node manager 618, authority node manager 628, user interface manager 632, logging node manager 648, and authority agent 680 can be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

CCMS in the Cloud-Based Distributed Security System

The CCMS 180 can be used to ensure proper configuration of the processing nodes 610, the authority nodes 620, the logging nodes 640, and the like. In an exemplary embodiment, the CCMS 180 can be a node in the system 600. In another exemplary embodiment, the CCMS 180 can be implemented in any of the processing nodes 610, the authority nodes 620, the logging nodes 640, etc. It is important, in the system 100, to ensure the proper configuration of the nodes 610, 620, 640 for providing security. The CCMS 180 can be utilized to detect misconfigurations both with respect to the golden configuration and the golden ++ configuration for specific customer configurations. For the system 100, the different roles can be the processing node 110, the authority node 120, and the logging node 140.

CCMS User Interface

Referring to FIGS. 8-14, in exemplary embodiments, screen diagrams illustrate exemplary user interface screens for an operation of the CCMS 180. FIG. 8 is a screen diagram of a login screen 800 after logging into the CCMS 180. The CCMS 180 can be access via a HTTP/HTTPS or via an application. There are four tabs, for example, HOW TO RUN, SELECT MACHINES, EXECUTE, and RESULTS. FIG. 9 is a screen diagram of a selection screen 802 when the SELECT MACHINES tab is selected. The screen 802 allows selection of a specific cloud node 102 by searching for a specific machine by name or by selecting a cloud and a role 804 and selecting from a list of machines.

FIG. 10 is an execution screen 806 after selecting one or more machines in the selection screen 802. The execution screen 806 lists the selected cloud and the associated machines. To initiate the audit, a user can select a SUBMIT button. During execution, a banner is shown which can display progress. Upon completion, FIG. 11 is an execution screen 808 after completion. The execution screen 808 lists the machines and the detected anomalies. Further, the user can select a DETAILED REPORT. FIG. 12 is a detailed screen 810 which lists parameters and counts of file changes per parameter. FIG. 13 is a detailed screen 812 which lists the cloud nodes which can be selected to expand a list showing the anomalies. The anomalies are displayed showing the configured value versus the golden value. Finally, FIG. 14 is a results screen 814 which lists the clouds, last audit, and selection to bring up the detailed screens 810, 812.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for managing a cloud system comprising a plurality of cloud components comprising one or more servers, the method comprising:
    defining a plurality of golden configurations for the plurality of cloud components, wherein each of the plurality of golden configurations comprises settings for a combination of parameters and features that are associated with a specific cloud component operating a specific role or service;
    responsive to an audit, obtaining a current configuration of associated cloud components for the audit, and analyzing the configuration using a set of metadata rules for an associated golden configuration; and
    determining misconfigurations of any of the associated cloud components based on the analyzing.

2. The method of claim 1, further comprising:
    periodically adjusting one or more of the plurality of golden configurations or adding new golden configurations based on updates or changes to the specific role or service.

3. The method of claim 1, further comprising:
    approving one or more known exceptions in the misconfigurations and storing the one or more known exceptions for the set of metadata rules.

4. The method of claim 1, wherein the plurality of golden configurations comprise defined component roles, configuration files, feature sets, and configuration deviations.

5. The method of claim 1, wherein the metadata rules are parameters of configuration files and feature sets which are categorized into a plurality of buckets, and wherein the misconfigurations are determined based on comparisons of the plurality of buckets with the current configuration.

6. The method of claim 5, wherein the plurality of buckets include a mandatory bucket where a parameter must be present, a conditional mandatory bucket where a parameter must be present subject to a condition, and an ignored mandatory bucket where a parameter must only be present regardless of its value.

7. The method of claim 1, wherein the audit is performed one or more of periodically and on demand.

8. The method of claim 1, further comprising:
    performing a remedial action based on the misconfigurations.

9. The method of claim 1, wherein the obtaining and the analyzing is performed by a separate device from the associated cloud components which continue to operate.

10. A system configured to manage a cloud system comprising a plurality of cloud components comprising one or more servers, the system comprising:
    a processor and network interface communicatively coupled to one another; and
    memory storing instructions that, when executed, cause the processor to:
        define a plurality of golden configurations for the plurality of cloud components, wherein each of the plurality of golden configurations comprises settings for a combination of parameters and features that are associated with a specific cloud component operating a specific role or service;
        responsive to an audit, obtain, via the network interface, a current configuration of associated cloud components for the audit, and analyze the configuration using a set of metadata rules for an associated golden configuration; and determine misconfigurations of any of the associated cloud components based on the analyzing.

11. The system of claim 10, wherein the memory storing instructions that, when executed, further cause the processor to:

periodically adjust one or more of the plurality of golden configurations or adding new golden configurations based on updates or changes to the specific role or service.

12. The system of claim 10, wherein the memory storing instructions that, when executed, further cause the processor to:

approve one or more known exceptions in the misconfigurations and store the one or more known exceptions for the set of metadata rules.

13. The system of claim 10, wherein the plurality of golden configurations comprise defined component roles, configuration files, feature sets, and configuration deviations.

14. The system of claim 10, wherein the metadata rules are parameters of configuration files and feature sets which are categorized into a plurality of buckets, and wherein the misconfigurations are determined based on comparisons of the plurality of buckets with the current configuration.

15. The system of claim 14, wherein the plurality of buckets include a mandatory bucket where a parameter must be present, a conditional mandatory bucket where a parameter must be present subject to a condition, and an ignored mandatory bucket where a parameter must only be present regardless of its value.

16. The system of claim 10, wherein the audit is performed one or more of periodically and on demand.

17. The system of claim 10, wherein the memory storing instructions that, when executed, further cause the processor to:

performing a remedial action based on the misconfigurations.

18. The system of claim 10, wherein the associated cloud components continue to operate during analysis.

19. A non-transitory computer-readable medium storing computer-executable instructions that, when executed, cause a processor to perform steps of:

defining a plurality of golden configurations for the plurality of cloud components, wherein each of the plurality of golden configurations comprises settings for a combination of parameters and features that are associated with a specific cloud component operating a specific role or service;

responsive to an audit, obtaining a current configuration of associated cloud components for the audit, and analyzing the configuration using a set of metadata rules for an associated golden configuration; and determining misconfigurations of any of the associated cloud components based on the analyzing.

20. The non-transitory computer-readable medium of claim 19, wherein the computer-executable instructions that, when executed, further cause the processor to perform steps of:

periodically adjusting one or more of the plurality of golden configurations or adding new golden configurations based on updates or changes to the specific role or service.

* * * * *